United States Patent Office 3,785,962
Patented Jan. 15, 1974

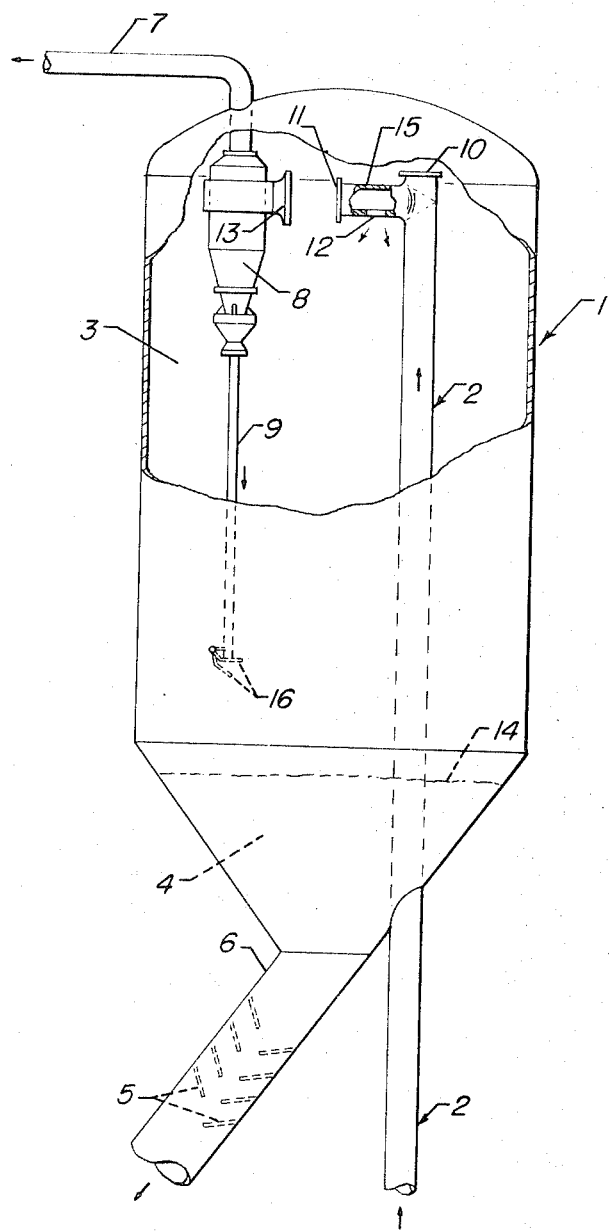

3,785,962
FLUIDIZED CATALYTIC CRACKING PROCESS
Algie J. Conner, Des Plaines, and Charles W. Strother and Willas L. Vermilion, Arlington Heights, Ill., assignors to Universal Oil Products Company, Des Plaines, Ill.
Filed Dec. 27, 1971, Ser. No. 212,252
Int. Cl. C10g *11/18*
U.S. Cl. 208—164                    13 Claims

ABSTRACT OF THE DISCLOSURE

A fluidized cracking process in which a riser type reaction zone empties into the dilute phase portion of a reception vessel. The process can be generally described as one in which the riser reaction zone is substantially vertical and passes into the reception zone with the outlet of the riser located within the dilute phase portion of the reception vessel. Adjacent to the riser outlet is a cyclone separation means which separates hydrocarbons and solids present in the dilute phase. The process is generally applicable to fluidized hydrocarbon conversion processes and specifically adaptable for use in modern fluidized catalytic cracking processes in which short catalyst-oil contact times are desired.

BACKGROUND OF THE INVENTION

Field of the invention

The field of art to which this invention pertains is hydrocarbon processing. Specifically this invention relates to a fluidized catalytic cracking process in which the catalyst and oil are contacted for a certain period of time in a riser reaction zone and thereafter separated in a reception zone.

Prior Art

The prior art which is relevant to this invention can be found in classes covering fluidized conversion processing, and in particular fluidized catalytic cracking.

It is known in the art, that in certain instances, it is desired to substantially reduce the catalyst-oil contact times which have been used in industry for the past 20 or more years. Specifically, refiners have utilized riser cracking processes to eliminate the possibility of harmful secondary reactions which cause degradation of product quality. The solutions presented as can be seen in the patent art have centered around the use of cyclones connected to risers and the use of the so called "folded riser" systems in which a vertical riser is designed so that it makes a complete U turn with its outlet ending up in a dense bed portion of fluidized and partially deactivated catalyst. Specifically, applications are now pending relating to the "folded riser" systems.

We have found, however, that in systems in which a riser reaction zone is caused to discharge into a dense bed of partially deactivated catalyst that the turbulence created causes some of the catalyst from the riser and/or the dense bed to be passed into the dilute phase in the reception zone. This turbulence causes secondary reactions to occur since there is sufficient quantity of catalyst contacting the hydrocarbons in the dilute phase to cause secondary reaction and reduction in product quality. The discharge of catalyst and oil directly into a dense bed of partially deactivated catalyst additionally causes any hydrocarbons which pass into the dense bed to contact a high density of catalyst thereby effecting an extremely high and localized catalyst over oil ratio and high catalyst and oil contact times. While these conditions may increase the possibility of further reaction of the hydrocarbons and increased conversion, in almost all instances the product yields are inferior. When desiring to produce high octane gasoline and alkylatable olefins it is much preferred to increase conversion by the use of increased temperatures and/or high catalyst to oil ratios rather than long contact times of catalyst and oil.

Our invention by requiring the riser to discharge into the reception zone from the dilute phase in a direction towards the dense bed of catalyst and reasonably close to an inlet of a cyclone separation zone prevents undue agitation of the dense bed while substantially reducing any potential secondary reaction.

SUMMARY OF THE INVENTION

Our invention can be basically summarized as an improved fluidized conversion process in which a riser reaction zone empties catalyst and oil from a dilute phase portion of a reception zone in a direction towards a fluidized dense bed of partially deactivated catalyst located in the zone. In a preferred embodiment, our invention resides in a process in which a riser reactor conduit carries a fluidized catalyst and oil stream into a reception zone in which a dense bed of partially deactivated catalyst is maintained in a lower portion thereof; hydrocarbons which leave the riser conduit are directed towards and pass through a separation means and out of the reception zone. Partially deactivated catalyst which passes out of said riser conduit passes towards the dense bed of partially deactivated catalyst and is removed from said reception zone for eventual reuse in said riser conduit; wherein an improvement comprises, discharging from a dilute phase portion in said reception vessel said catalyst and oil stream from said riser towards said dense bed within said reception zone.

DESCRIPTION OF THE DRAWING

The attached drawing briefly describes the process of our invention.

Shown in the drawing are the reception zone 1, riser conduit 2, cyclone separation means 8, dilute phase portion 3 and dense bed 4.

The catalyst and oil pass into the riser 2 at a lower portion with the amount of catalyst and oil passing into riser 2 being regulated by well-known techniques. The catalyst and oil pass vertically up through the riser wherein reactions occur producing light and more valuable components from the heavier vacuum gas oil feed. The mixture of hydrocarbon and catalyst continues through riser 2 and is directed by a right angle to section 15 of riser 2. Line flange 10 located on the end of riser 2 is placed so that a certain volume of the riser is contained above the top horizontal portion of section 15. This section provides volume which can fill up with catalyst and hydrocarbon vapors and creates a vapor cushion thereby preventing attrition in the upper portion of the riser when catalyst particles are directed at a 90° angle from vertical movement to horizontal movement.

The catalyst and oil continue horizontally in a direction towards line flange 11. Line flange 11 is constructed similarly to flange 10 and also provides a space in which catalyst can build up to prevent attrition of the flange and line 15 when the catalyst and oil which are flowing in a horizontal direction are caused to be deflected 90° from a horizontal to a vertical downward direction out of outlet 12. As can be seen, the upper portion of riser 2 is designed so that the catalyst and oil passing through riser 2 changed direction twice—namely up vertical to horizontal and horizontal to downward vertical.

The catalyst and oil which pass out of outlet 12 of the riser enter the dilute portion 3 of the reception zone. Cyclone separation means 8 is located adjacent to the outlet 12 so that hydrocarbons and some entrained catalyst can pass in as short a period of time as is possible from discharge 12 into the cyclone inlet 13. In the cyclone, hydrocarbons and catalyst are substantially separated with a catalyst free hydrocarbon effluent stream passing out of the cyclone through outlet conduit 7. The catalyst which is essentially free of product hydrocarbons passes through dip leg 9 discharging above dense bed 4. In some instances the dip leg ends within the dense bed 4 and below interface 14 which defines the boundaries between the dilute and dense phase portions within the reception zone. In other instances the dip leg ends above the dense bed 4 and will contain a flapper valve 16 as shown which will release catalyst when a level of catalyst builds up in the dip leg.

The catalyst which is discharged from the cyclone dip leg 9 and riser outlet 12 eventually ends up in dense bed 4. At the bottom portion of the reception zone is stripping means 6. The stripping means contains baffles 5. The baffles cause a thorough mixing of deactivated catalyst and a stripping stream which passes in an upward direction. The catalyst moves in a general downward direction through stripper 6 and after having been stripped can pass into a regeneration means and made ready for reuse in the process. The stripping stream causes hydrocarbons which have been adsorbed by the partially deactivated catalyst to be removed from the catalyst eventually passing out of the reception vessel via conduit 7. The stripping prevents the oxidation of valuable gasoline and light hydrocarbons which if not stripped would be burned in the regeneration zone thereby decreasing yield on feed.

DETAILED DESCRIPTION OF THE INVENTION

Our invention can be utilized specifically in fluidized catalytic cracking operations to improve the efficiency of gasoline production from such processes.

Catalysts which can be used in the process of this invention include those known to the art as fluidized catalytic cracking catalysts. Specifically, the high activity zeolite containing catalysts can be used and are preferred. The zeolite catalysts which are used to a high degree in present day fluidized catalytic cracking should contain various quantities of the rare earth metals exchanged on the zeolite to offer the high activity catalyst. The decationized sieves of the type X or type Y structure are especially preferred in this process.

The high activity catalysts are preferred because of the fact that process flow does not allow the hydrocarbon effluent from a riser reaction zone to be further contacted with large quantities of partially deactivated or fresh catalyst. In order to compensate for the relatively low catalyst-oil contact times which occur in this process, the reactor temperatures should be increased to temperatures higher than those normally utilized in prior art processes. Also high activity catalysts should be utilized to help effect a reasonable conversion when the low catalyst-oil contact times occur.

The well-known amorphous catalysts may also be used. Feed stocks which can be used in the process typically are derived from crude sources present throughout the world. Preferable feed stocks include the vacuum gas oils which typically boil within the range of from about 300 up to 1000° F. or higher. The term feed stock can also include recycle materials such as light or heavy cycle oil or slurry oil which are separated from the hydrocarbon effluent leaving the riser reaction zone by the main fractionation column.

The light cycle oils generally boil within the range of from about 400 to 600° F. with 90% boiling below 550° F., the heavy cycle oils boil from about 600 to 800° F., and the slurry oils (clarified oil) generally boil at temperatures in excess of about 800° F.

Any or all of the recycle materials passed into the riser reaction zone can be partially hydrogenated to make them less refractory and enhance the production of highly branched aromatics which generally provide high octane.

In a typical process flow, finely divided regenerated catalyst which leaves a riser reaction zone contacts a feed stock at a lower portion of the riser. The resultant mixture passes up through the riser while conversion of the feed to gasoline and lighter and heavier components occurs. The catalyst and hydrocarbon effluent materials pass through the riser into what is referred to as a reception zone. The effluent is discharged from the riser into the reception zone from a dilute phase portion within the reception zone. The hydrocarbons removed from the riser are then immediately removed from the reception zone after passing through one or more cyclone separation means to separate any catalyst entrained by the hydrocarbons. The hydrocarbon removed from the reception zone passes into a fractionation zone known in the art as a main column. The main column separates the hydrocarbon effluent into light gases, fuel gases, gasoline, light cycle oil, heavy cycle oil, and slurry oils. Various components from the main column can be recycled along with the feed stock to the riser. Some or all of the components from the main column may be recovered as product materials.

The catalyst which leaves the riser passes into the lower portion of the reception zone and eventually leaves that zone passing through a stripping means which causes a stripping gas to concurrently contact the partially deactivated catalyst purging the adsorbed hydrocarbons from the catalyst. The catalyst leaves the stripping zone and generally passes into a regeneration zone. The regeneration zone causes combustion of coke which is present on the partially deactivated catalyst rendering a freshly regenerated catalyst which contains a minimum quantity of coke. Typically, the partially deactivated catalyst contains from .5 up to 1 or more wt. percent coke while the freshly regenerated catalyst contains less than about 0.5 and more typically 0.1 to 0.3 wt. percent coke.

The stripping gas reduces yield losses by preventing hydrocarbons adsorbed on the partially deactivated catalyst from being burned in the regenerator. Typically stripping gases can include nitrogen, hydrogen, steam, or light hydrocarbons and any other substance which would not react with the partially deactivated catalyst and would not contaminate the products.

In the regeneration zone, the partially deactivated catalyst contacts an oxygen containing stream causing oxidation of the coke to carbon dioxide, carbon monoxide, and water. The flue gas materials which leave the regenerator are typically vented after passing through a carbon monoxide steam generator. Typically, the oxygen containing stream passed into the regenerator is air but in some instances the air stream may be either enriched or deficient in oxygen.

Typically, riser reaction zones include relatively long and substantially vertical conduits which can vary in diameter from less than 1 inch up to 10 or more feet in diameter with lengths varying from a few feet up to 150 feet or more. The reception zone is typically larger in diameter than the riser and shorter in length. The reception zone typically is cylindrical in nature having cyclone separators located within it to separate entrained catalysts from hydrocarbons which leave the reception zone and which have been passed into it via the riser. The reception zone is designed and operated to maintain a dense fluidized bed of partially deactivated catalyst in its lower portion to maintain a seal on the cyclone dip leg and to allow efficient stripping of the catalyst in the lower portion of the reception vessel.

Typically catalytic cracking conditions include reactor temperatures within the range of from about 750° F. up to about 1200° F. or higher, pressures within the range of from about ambient up to about 100 p.s.i.g., a feed stock preheat temperature of anywhere from about ambient up to about 800° F., a combined feed ratio of from about 1 up to about 2 or higher, weight hourly space velocities of anywhere from about 4 up to about 100 or higher and catalyst to oil ratios ranging anywhere from about 3 up to about 15 or higher.

Regeneration conditions include temperatures within the range of from about 1000 up to about 1300° F. or higher.

The term "conversion" as used in this specification generally refers to the volume percent of fresh feed which is converted to materials lighter than the light cycle oil as separated on the main column but corrected for the gasoline content of the fresh feed charge. It is generally calculated by subtracting the sum of the volumetric yields of light cycle oil, heavy cycle oil and clarified oil from 100%, for example, if 12 vol. percent yield of feed was light cycle oil and 3 vol. percent yield was clarified oil, the conversion is calculated to be 85% assuming no gasoline was present in the fresh feed.

The term "gasoline efficiency" is defined as the ratio of the volumetric yield of gasoline over the conversion. In this case the gasoline is defined at product material of $C_5$ to 90% over at 380° F. as determined by A.S.T.M. D–86 distillation.

The reception zone generally contains two phases. Typically there is what is referred to in the art as the dilute phase portion which is the upper volume within the reception zone and the dense phase portion which is in the lower portion of the zone. The dense phase portion contains a fluidized bed of partially deactivated catalyst. Since in most instances there is no hydrocarbon other than stripping gas which passes through this fluidized bed, the catalyst is not entrained but remains within the confines of the bed. The dilute phase portion contains some entrained catalyst since hydrocarbons and partially deactivated catalysts are discharged from the riser from the dilute phase portion within the reception zone.

The process of our invention requires that the riser empty its hydrocarbon and deactivated catalyst effluent stream into the reception zone from the dilute phase portion in the reception zone. One of the reasons this requirement is made is that the hydrocarbons effluent leaving the riser is required to be quickly separated from the deactivated catalyst and unless a cyclone separation zone is directly connected to the riser this separation would not occur as quickly as required if the riser should empty to the dense bed phase. Other reasons included reduction of undesired secondary reactions.

In the prior art fluidized catalytic cracking processes a riser typically empties into the bottom portion of a reception zone which contains a dense bed of catalyst. The effluent from the riser is further contacted with the dense fluidized bed causing further conversion with degradation of product quality. In other prior art processes, a riser typically referred to as a "folded riser" passes into a reception zone through an upper portion of the reception zone and extends down into the dense bed of catalyst located within the rectption zone. This type of flow scheme is not satisfactory when it is desired to prevent secondary reactions from occurring since the discharge of catalyst and oil from the vertical riser into the dense bed causes a high degree of turbulence which in turn causes catalyst and hydrocarbons to be carried into the dilute phase portion within the reception zone. This allows secondary reactions to occur since hydrocarbons can contact catalyst allowing additional conversion to take place in the dilute phase portion. Also hydrocarbons which pass in to the dense bed can be further reacted.

The process of our invention preferably requires for commercial units at least a few feet between the riser discharge and the inner face between the dilute and dense phases within the reception zone. The riser preferably contains a T- or U-shaped bend located near its discharge so that catalyst which discharges from the vertical riser is passed substantially perpendicular to the inner face between the dense and dilute phases and even more preferably in a vertical downward direction.

In this invention when referring to a "first distance" we mean the distance from the top of the dense bed of catalyst maintained in the reception zone. This distance is normally measured by actually measuring the distance from the outlet (in the drawing, labeled 12) to where the interface between the dense bed and dilute phase is believed to exist. Sometimes the interface is quite difficult to determine. In this instances the interface location can be assumed to be midway between the points where dilute phase and dense bed exist.

The "second distance" shall mean the distance from the riser outlet to the cyclone separation zone inlet. Where more than one cyclone is used in parallel, this distance is the average between the outlet and the individual cyclone inlet. If the cyclones are placed in series arrangement the "second distance" is measured from the inlet of the first cyclone the hydrocarbons pass into.

The ratio of said first distance to said second distance, for purposes of this specification, should be greater than two. This is required so that the outlet of the riser empties into the reception zone closer to the cyclone than the interface of the dilute phase and dense bed. The preferred ratio is from about 2 up to about 6 or higher. The ratio may even be greater than about 15.

As previously mentioned, the riser is required to discharge at a sufficient distance above the dense bed to prevent the dense bed from being stirred up causing excessive amounts of catalyst to pass into the dilute phase. The excessive quantities of catalyst in the dilute phase portion cause excessive reactions which reduce the gasoline efficiency values.

Another advantage for using the present invention resides in preventing catalyst losses due to high reactor catalyst velocities. In the prior art system the high riser velocities of catalyst and oil caused undue wear on the cyclones and also caused excessive amounts of catalyst to be entrained in the upper portion of the reception zone. The catalyst would then pass in to the main column. The present system avoids this problem by directing the oil-catalyst effluent stream from the riser in a direction towards the dense bed at a sufficient height from the bed to prevent excess catalyst from being entrained in the dilute phase wearing down the cyclones and causing loss to the main column.

EXAMPLE

In this example, a comparison was made between a prior art FCC commercial unit and the same unit which had been revamped to perform the claimed invention.

The prior art FCC unit was a UOP "stacked unit" constructed in the early 1950's to process about 3500 b.p.d. feed stock. Prior to revamp, the unit was capable of processing about 10,000 b.p.d. of feed stock. The basic flow pattern of the prior art unit required that the riser, which was about 28″ O.D., empty directly into a dense bed of partially deactivated catalyst located in the lower portion of the reactor (now referred to as the reception zone). The riser was substantially vertical, entered the lower portion of the reception vessel and ended near the bottom of the reactor.

The feed and catalyst leaving the riser passed directly into the reception zone contacting the catalyst bed which was maintained in the lower portion of that zone. In this manner, the feed stock could, after contacting catalyst in the riser, contact a larger quantity of catalyst in the dense bed to cause additional conversion of feed stock to lighter materials. As will be illustrated latter, the additional contacting of feed stock with catalyst in the reception vessel is not the only method of increasing conversion. This method appears to give increased conversion at the expense of gasoline production and valuable $C_3$ and $C_4$ production.

With changes in the prior art unit, a unit operating according to the disclosed invention was constructed. Basically, the changes made included extending the riser up through the reception zone so that it ended above the part of the reception zone which carried the dense bed of partially deactivated catalyst. A single "T" arrangement was located on top of the riser so that the catalyst and oil passing through the riser was discharged into the reception vessel in a downward direction. The single "T" was located adjacent to a cyclone separator which separated any catalyst which was entrained in the dilute phase (upper) portion of the reception vessel by vapors.

The cyclone and the discharge from the riser were both located near the upper location of the reception zone so that hydrocarbons which were discharged from the riser would only have to traverse a minimum distance before being separated from any entrained catalyst present in the dilute phase. The riser discharge is located at a sufficient distance above the interface between the dilute phase and dense catalyst bed or the bottom of the reception zone if no dense bed of catalyst was maintained therein, to prevent discharging catalyst from agitating the dense bed or being deflected back into the dilute phase. It is desired to design the riser discharge and the reception zone vessel in a compatible manner to minimize the quantity of catalyst which is present in the dilute phase portion. By doing this, the possibility of secondary reactions occurring is substantially if not totally eliminated.

We have found from pilot plant and commercial unit studies that it is desired to maintain the dilute phase average density below about 10 lbs./ft.$^3$ at operating condititons. The dense bed average density varies depending on the type of catalyst used, the quantity of coke present on it, and the degree of stripping stream and/or feedstock countercurrently contacting it. Generally, the densed bed density averages around 30 lbs./ft.$^3$ and very often exceeds this value going up to 40 lbs./ft.$^3$ or higher. The average density of catalyst and oil passing through risers varies from about 5 to 7 lbs./ft.$^3$ over the entire length of the riser. It is therefore preferred that the dilute phase average density be less than the average density of the riser catalyst and oil stream. Specifically it is preferred that the average density of dilute phase be anywhere from about less than 3 to about 6 lbs./ft.$^3$.

In the process of this invention, the FCC unit used for testing had a reception zone which was essentially cylindrical in nature in having a length of 35 ft. and an inside diameter of about 7.5 ft. The outlet of the riser ended approximately 20 ft. from the bottom of the reception zone and was about 6 ft. from the cyclone inlet. In operating the process of this invention, the catalyst bed maintained in the bottom portion of the reception zone was below the lowermost extension of the cyclone dip leg but above the catalyst outlet to the stripper. In other words, the dip leg from the cyclone separation zone located in the upper portion of the reception zone was not sealed by the dense catalyst bed. The dip leg was fabricated to contain a flapper valve which discharged catalyst from the dip leg when a sufficient head of catalyst was built up to a predetermined level to allow catalyst discharge. In this manner, the cyclone dip leg was sealed even though no dense bed was maintained high enough to contact the dip leg.

At the bottom portion of the reception zone was a catalyst outlet which was connected to a catalyst stripping zone through which a stripping stream passed countercurrently to the deactivated catalyst to remove hydrocarbons from the catalyst. The stripping zone was connected to a regeneration zone which burned coke off of the catalyst. The level of catalyst maintained at the bottom portion of the reception zone was minimized in order that agitation of catalyst material would be prevented from the discharge of catalyst and oil in a downward direction from the riser.

Before the plant was revamped, a test was run to determine a yield and operating conditions which could be used as a base case in evaluating the improvements resulting from the revamp. The quantity of feed and catalyst passing through the riser before the revamp for the basic case can be calculated using the catalyst to oil ratio and the feed input volume. The catalyst used before the revamp and afterwards was a high density crystalline aluminosilicate catalyst which was of high activity. The charge stock used before and atfer the revamp was a Louisiana sweet crude. Prior to revamp the average catalyst-oil contact time was about 20 seconds and included both contacting in the riser and the dense bed located in the bottom of the reactor (reception zone). After the revamp, the average catalyst-oil contact time was about 4 seconds. Essentially all of the feed conversion occurred in the riser.

The test results for the above described operations are shown in the table below.

YIELD CONPARISONS BEFORE AND AFTER REVAMP OF FCC UNIT

|  | Before | After | | |
|---|---|---|---|---|
|  | 1 | 2 | 3 | 4 |
| Operating conditions: |  |  |  |  |
| Raw oil B/D | 10,040 | 9,580 | 9,870 | 7,920 |
| Raw oil temp., °F | 650 | 692 | 7о5 | 751 |
| Comb. feed temp., °F | 620 | 655 | 680 | 708 |
| Comb. feed ratio | 1.02 | 1.03 | 1.04 | 1.05 |
| Cat./oil ratio | 6.3 | 6.6 | 7.0 | 7.2 |
| Reactor temp., °F | 930 | 935 | 953 | 1001 |
| Regen. temp., °F | 1225 | 1207 | 1207 | 1249 |
| Conversion, LV% | 80.2 | 77.5 | 80.7 | 89.6 |
| Products, LV%: |  |  |  |  |
| $C_5$–380° F. at 90% gasoline | 63.0 | 67.1 | 68.6 | 70.2 |
| $C_3$=LV% | 6.5 | 5.9 | 6.5 | 9.5 |
| $C_4$=LV% | 5.7 | 6.8 | 7.8 | 9.5 |
| $C_2$–, wt. percent | 1.9 | 1.1 | 1.5 | 3.0 |
| Coke, wt. percent | 4.9 | 4.5 | 4.7 | 5.7 |
| Gasol: |  |  |  |  |
| Gasoline efficiency, conversion | .786 | .866 | .850 | .783 |
| $C_3$+potential liquid recovery, LV% | 109.0 | 112.6 | 112.5 | 113.8 |
| Potential alkylate, LV% | 21.4 | 22.2 | 25.0 | 33.2 |
| FCC Gasol plus poten. alky. LV% | 84.4 | 89.3 | 93.6 | 103.4 |
| Octanes: |  |  |  |  |
| FCC gasoline R-O | 88–89 | 88 | 89 | 92 |
| FCC gasoline M-O |  | 79 | 79 | 81 |

In comparing the yield results, the following observations can be made. The conversion at substantially identical operating conditions was somewhat reduced but the gasoline efficiency was substantially increased when comparing the old and revamp operations.

The reduction in conversion was expected since the degree of conversion of feed stock to materials lighter than light cycle oil is generally dependent on the length of time that catalyst and oil are allowed to contact each other. It was our observation that the extended catalyst to oil contact time also increases the production of undesirable light components, such as methane, ethane, $C_3$ paraffins, and $C_4$ normal paraffins, are substantiated by the increased gasoline efficiencies for comparative conversions for tests 2, 3 and 4.

In comparing tests 1 and 3 which were run at substantially identical conversion levels, the gasoline efficiency increased substantially as did the potential alkylate material which could be derived from the isobutane, $C_4$ olefins, and $C_3$ olefins produced using the revamped unit.

In tests 2, 3 and 4, which in some instances vary from the test 1 operating conditions, the potential alklate yield was higher in all instances when compared to test 1. The potential alkylate yield is expressed in liquid volume percent and represents the volume percent of a FCC fresh feed basis of alkylate produced from the $C_3$ and $C_4$ olefins and isobutane produced by FCC process with additional outside isobutane included to alkylate all the olefins.

The total quantity of FCC gasoline plus potential alkylate based on FCC fresh feed yields was higher for tests 2, 3 and 4 when compared to test 1. The octane numbers as shown for tests 2, 3 and 4 were at least as high if not higher than the octane of the FCC gasoline for test 1.

The above example is presented to show actual test results from existing units operating according to our invention. The scope of the claims is not to be unduly limited by the content of this example.

We claim as our invention:

1. In a catalytic cracking process in which a riser conduit discharges a catalyst and oil stream from a riser outlet into a reception zone, hydrocarbons are removed from said zone at an upper portion and partially deactivated catalyst discharged from said riser is directed to the bottom of said zone and is removed from said zone at a lower portion, said reception zone operated to maintain a dilute phase volume occupying an upper portion of said zone, said dilute phase volume characterized as containing hydrocarbon vapors and entrained catalyst particles, the improvement comprising discharging said catalyst and oil stream downwardly from said riser outlet within said dilute phase at a distance above the lower portion of said zone to maintain a dilute phase average density of less than about 10 lbs./ft.$^3$ at operating conditions, and further discharging said stream from said riser outlet at a point adjacent to and in front of the inlet of a cyclone hydrocarbon-catalyst separation zone.

2. Claim 1 further characterized in that said dilute phase average is less than about 7 lbs./ft.$^3$ at operating conditions.

3. Claim 2 further characterized in that said dilute phase average density is less than about 5 lbs./ft.$^3$ at operating conditions.

4. Claim 1 further characterized in that said riser conduit has an inside diameter within the range of from about 12 to about 60 inches and an overall length within the range of from about 10 feet to about 150 feet.

5. Claim 1 further characterized in that a fluidized bed of partially deactivated catalyst is maintained at said lower portion within said zone.

6. Claim 5 further characterized in that said riser outlet is greater than 10 feet above said fluidized bed of partially deactivated catalyst.

7. In a catalytic cracking process in which a riser conduit discharges a fluidized catalyst and oil stream from a riser outlet into a reception zone in which a dense bed of partially deactivated catalyst is maintained in the lower portion thereof and a dilute phase is maintained above said dense bed, effluent hydrocarbons which leave the riser outlet are removed from said zone at an upper portion, partially deactivated catalyst which passes out of said riser outlet passes into the dense bed maintained within the reception zone, partially deactivated catalyst from said dense bed is removed from said reception zone at a lower portion of said bed and regenerated in a regeneration zone for eventual reuse in said riser conduit, the improvement comprising discharging said catalyst and oil stream downwardly from said riser outlet within said dilute phase portion at a distance above said dense bed to maintain a dilute phase average density of about less than 7 lbs./ft.$^3$ at operation conditions, and further discharging said stream from said riser outlet at a point adjacent to and in front of the inlet of a cyclone hydrocarbon-catalyst separation zone.

8. In a catalytic cracking process in which a riser reactor conduit discharges a catalyst and oil stream from a riser outlet into a reception zone which zone maintains a fluidized dense bed of partially deactivated catalyst in a lower portion of said zone and a dilute phase portion above said bed and wherein an interface is maintained between said phases, an effluent stream containing hydrocarbons carried into said zone by said riser conduit is removed from the dilute phase of the reception zone and a partially deactivated catalyst is removed from the fluidized bed of catalyst in the reception zone, the improvement comprising discharging said catalyst and oil stream from said riser outlet within said dilute phase towards said dense bed of catalyst and above said interface at a distance sufficient to maintain said dilute phase average density at less than about 7 lbs./ft.$^3$ at operating conditions, and further discharging said stream from said riser outlet at a point adjacent to and in front of the inlet of a cyclone hydrocarbon-catalyst separation zone.

9. Claim 8 further characterized in that said riser outlet discharges into said dilute phase at a distance greater than about 10 feet above said interface.

10. Claim 8 further characterized in that said average density is less than about 5 lbs./ft.$^3$ at operating conditions.

11. In a catalytic cracking process in which a riser conduit discharges from a catalyst and oil stream from a riser outlet into a reception zone in which hydrocarbons are separated from entrained catalyst and removed from said zone through a cyclone separation zone located in a dilute phase portion within said reception zone, said cyclone having an inlet through which hydrocarbons and entrained catalyst flow and a hydrocarbon outlet which discharges hydrocarbons out of said reception zone, partially deactivated catalyst from said riser is directed to a dense bed of said zone and is removed from said zone from the dense bed of catalyst located in the zone, said reception zone operated to maintain a dilute phase volume characterized as containing hydrocarbon vapors and entrained catalyst and located above said dense bed in said zone, the improvement comprising discharging said catalyst and oil stream downwardly from said riser outlet within said dilute phase at a first distance above said dense bed of catalyst and at a second distance from said cyclone inlet so that the ratio of said first distance to said second distance is greater than 2 to thereby maintain a dilute phase average density of less than about 6 lbs./ft.$^3$ at operating conditions, said second distance from said cyclone inlet being immediately adjacent thereto, and said riser outlet and said cyclone inlet being in approximately the same lateral plane with regard to said reception zone.

12. Claim 11 further characterized in that said ratio is greater than about 4.

13. Claim 11 further characterized in that said first distance is greater than about 20 feet and said second distance is less than about 8 feet.

References Cited
UNITED STATES PATENTS

| | | | |
|---|---|---|---|
| 3,188,184 | 6/1965 | Rice et al. | 208—164 |
| 3,607,129 | 9/1971 | Carson | 208—164 |
| 3,448,037 | 6/1969 | Bunn et al. | 208—164 |
| 3,630,886 | 12/1971 | Deed et al. | 208—164 |
| 3,475,326 | 10/1969 | Luckenbach | 208—164 |
| 3,607,127 | 9/1971 | Pfeiffer | 208—164 |

HERBERT LEVINE, Primary Examiner

U.S. Cl. X.R.

23—288 S; 208—153, 164